United States Patent
Robertson et al.

(10) Patent No.: US 6,679,225 B2
(45) Date of Patent: Jan. 20, 2004

(54) COMPENSATION FOR FUEL VOLATILITY FOR INTERNAL COMBUSTION ENGINE START AND RUN

(75) Inventors: William R. Robertson, Irondequoit, NY (US); Sergio Eduardo Garcia, Webster, NY (US); Craig A. Carlson, Honeoye Falls, NY (US); Darrell W. Burleigh, Henrietta, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/150,830

(22) Filed: May 16, 2002

(65) Prior Publication Data

US 2003/0213475 A1 Nov. 20, 2003

(51) Int. Cl.$^7$ ............................................. F02D 41/06
(52) U.S. Cl. .................... 123/436; 123/478; 123/486; 123/491
(58) Field of Search .................. 123/435, 436, 123/478, 480, 486, 488, 491, 494

(56) References Cited

U.S. PATENT DOCUMENTS

| | | | | |
|---|---|---|---|---|
| 5,419,296 A | * | 5/1995 | Yamaura | 123/435 |
| 5,492,101 A | * | 2/1996 | Saito et al. | 123/491 |
| 5,499,607 A | * | 3/1996 | Tomisawa | 123/435 |
| 5,582,157 A | * | 12/1996 | Uchikawa | 123/676 |
| 5,586,537 A | * | 12/1996 | Tomisawa et al. | 123/435 |
| 5,884,610 A | * | 3/1999 | Reddy | 123/520 |
| 6,079,396 A | | 6/2000 | Ament et al. | 123/674 |
| 6,176,222 B1 | * | 1/2001 | Kirwan et al. | 123/492 |
| 6,178,949 B1 | | 1/2001 | Kirwan et al. | 123/435 |
| 6,283,102 B1 | | 9/2001 | Nelson et al. | 123/575 |
| 6,360,726 B1 | * | 3/2002 | Javaherian | 123/491 |

* cited by examiner

Primary Examiner—Tony M. Argenbright
(74) Attorney, Agent, or Firm—Jimmy L. Funke (57) ABSTRACT

The present invention provides an improvement over conventional engine controls by adjusting engine air/fuel [AF] ratio, as a function of fuel volatility, during engine start and initial operation. It is comprised of three detection tests to determine the volatility of the fuel and provide compensation to the AF ratio in proportion to that volatility during engine crank and initial operation. The method includes compensating for incomplete fuel vaporization as a function of predicted intake valve temperature.

18 Claims, 7 Drawing Sheets

COMPENSATION FOR FUEL VOLATILITY FOR INTERNAL COMBUSTION ENGINE START AND RUN

INCORPORATION BY REFERENCE

Applicant incorporates by reference herein U.S. Pat. No. 6,003,496 issued to Maloney, et al, in that the method for determining the intake valve temperature exists in engine control systems that use pneumatic state estimators (PSE) and thermal state estimators (TSE) and need not be fully described in detail herein.

TECHNICAL FIELD

This invention relates to internal combustion engine operation and control, and more specifically, to engine operation and control responsive to fuel volatility.

BACKGROUND OF THE INVENTION

The need to be able to effectively start and run an internal combustion (IC) engine using fuels with a range of properties has been a problem that continually challenges engine calibrators. The fuel properties that pose problems include the vaporization pressure of the fuel, which is quantified by the Reid Vapor Pressure (RVP) or the Driveability Index (DI). Fuel refiners and distributors adjust the fuel vaporization pressure to correspond to seasonal ambient temperatures in order to optimize the cold start capability of IC engines in various geographic regions. This variation in vaporization pressure is created by balancing the amount of lower-, mid-, and heavier-weight hydrocarbon molecules in the fuel. The lower weight hydrocarbon molecules vaporize at lower temperatures, thus leading to more effective engine startability at low ambient temperatures. The fuel available can range in DI from under 1000 (highly volatile) in cooler areas to over 1250 (very stable) in hotter areas.

In addition, the fuel in a fuel tank may change vaporization characteristics over time, through a process called 'weathering'. The lower-weight hydrocarbon molecules may evaporate in the fuel tank. Passenger cars and trucks have evaporative systems that capture and store these evaporated hydrocarbons in a carbon canister and subsequently consume them by purging the canister through the engine. In engine applications where there is no evaporative system, these lower weight molecules may be vented to the atmosphere. Either way, the evaporative characteristics of the fuel remaining will have changed, and the suitability of the fuel for cold start operation will have also changed.

Engine manufacturers are faced with meeting requirements for stable start and run conditions. To meet the driveability requirements, engine management systems are calibrated using a sufficient amount of fuel to be robust when fuels of varying volatility are encountered. A typical approach to managing varying levels of fuel volatility has been to calibrate the system with excess fuel to ensure good driveability during engine start and initial operation. This use of excess fuel increases engine-out hydrocarbon and carbon monoxide emissions. In addition, the vehicle manufacturers must also comply with more stringent exhaust emissions regulations. An important strategy in meeting these emission regulations is to ensure that the engine runs at an air/fuel (AF) ratio that is at or near stoichiometry at the start of the engine, or soon thereafter. This is necessary to minimize engine out emissions and also to provide an exhaust gas feedstream to the catalytic converter that allows the converter to perform at optimum levels.

Engine and vehicle manufacturers accomplish this balance between meeting requirements for stable operation and meeting emissions regulations several ways. Extensive testing and calibration during the engine development phase is conducted. Hardware such as air injection pumps are added. The amount of precious metals (Palladium, Rhodium, and Platinum) contained in the catalytic converter is increased to improve effective conversion of pollutants. Each of these methods adds complexity and cost to the vehicle or engine.

Optimal operation and control of an engine occurs when the engine is in a warmed up state and is using an exhaust gas sensor to provide feedback to the engine controller for closed loop control of the engine. During the initial operation of the engine after start, especially a cold start, an engine may not be able to operate in closed loop fashion based on feedback from the exhaust gas sensor. This may happen for several reasons. The exhaust gas sensor typically takes a certain amount of time to become functional, i.e. to warm up or 'light-off'. This sensor light-off may take a few seconds, or it may take more than 30 seconds, depending on sensor design and placement, ambient conditions, and the temperature of the exhaust gas from the engine.

In addition to the exhaust gas sensor not being functional, the engine itself may not be sufficiently warmed up to operate at or near stoichiometry immediately after start. An engine that has high internal friction may require that there be more power to operate the engine when it is cold. This can lead to a need for corresponding rich AF operation to overcome the friction. Another factor is the design of the intake manifold, including placement of the fuel injectors. This can affect the amount of fuel that must be delivered to have a sufficient quantity of fuel vaporized to effectively operate the engine. Also, the design of the exhaust catalytic converter system may require the engine to operate in a manner that enables the catalyst to quickly light off and become chemically active. Balanced against this is the need to provide smooth, stable engine operation and the need to minimize tailpipe emissions.

Prior to sensor light-off the engine controller relies upon information other than the input from the exhaust gas sensor to control the engine. This includes inputs from other sensors and calibrations that are internal to the controller, e.g. crankshaft sensor, manifold absolute pressure sensor, and throttle position sensor. The engine controller can control the engine to a commanded AF ratio by monitoring input from the sensors and by using internal calibrations. This control will be based on the engine operating conditions that can be measured directly and conditions that are inferred from predictable behavior of the engine under the measured conditions.

The engine controller is still unable to manage engine roughness resulting from incomplete vaporization of the fuel and mixture with the air in individual cylinders that can occur as the result of unanticipated fuel volatility. This engine roughness will be manifested as instability in the engine crank speed during initial engine operation. Variations in crankshaft speed can also be related to design of the engine and variation in components of each cylinder due to part-to-part variability, deterioration of engine components and sensors, or various component or system malfunctions.

The prior art has sought to measure and compensate for fuel volatility by monitoring engine performance during initial engine operation. This is accomplished by monitoring the engine speed immediately after starting and comparing it to predetermined engine speed values that have been determined by testing prototype engines. This type of method will provide fuel compensation during initial operation based only on the measured engine speed. However, it is recognized that variations in fuel volatility affect the initial operation of the engine in several ways beyond the initial engine run speed. The prior art does not provide compensation for fuel volatility during engine cranking. Nor does it compensate for other effects of variation in fuel volatility, including engine roughness, and instability in engine firing during initial operation. The prior art also does not address a root cause of varying engine performance as a result varying fuel volatility, which is the effect of intake valve temperature on the incoming fuel.

Accordingly, a need exists for a more complete method to compensate for the variation in fuel volatility during engine start and initial operation.

SUMMARY OF THE INVENTION

The present invention provides an improvement over conventional engine controls by adjusting engine air/fuel [AF] ratio, as a function of fuel volatility, during engine start and initial operation. The AF ratio is used in the calculation of the engine fueling. Engine fueling is calculated by determining the air intake to the engine and dividing this value by the AF ratio.

The present invention is a method that is comprised of three detection tests to determine the volatility of the fuel and provide compensation to the AF ratio in proportion to that volatility during engine crank and initial operation. In the first detection test, crank time is monitored and compared to a threshold, which is a function of coolant temperature. If the crank time exceeds the threshold, an offset, called a crank AF adjustment term (CAFAT), is calculated based on the amount of time the threshold crank time is exceeded. This test ends when the engine makes the transition from start to run, and the crank AF adjustment term is stored for use during subsequent engine starting events. During subsequent engine starts, the crank AF adjustment term will be added to a base crank AF ratio to create a crank AF ratio which will be used by the engine controller to start the engine.

In the second detection test, the engine speed is measured at a specific time after the engine has been started, and is then compared to an engine speed threshold. If the engine speed falls below the threshold, a second term, called a first AF compensation term, is calculated that is based on the ratio of the engine speed and the engine speed threshold. This test occurs once per engine start and run cycle.

In the third detection test, engine roughness during initial operation of the engine is monitored. The engine roughness is compared to a threshold, and a second AF compensation term is calculated based on the magnitude of the engine roughness. This test can end after a specific amount of time, or a specific number of engine revolutions, or after a specific event has occurred, such as the engine going into closed loop operation. In an alternate embodiment, the test will estimate a temperature of an intake valve during the initial operation, and calculate the second AF compensation term based upon the magnitude of the engine roughness measured prior to when the estimate the temperature of an intake valve exceeds a threshold value.

A run AF adjustment term is then selected by comparing the first AF compensation term and the second AF compensation term, and selecting the greater value. The greater value will become the run AF adjustment term and can be stored for use on subsequent engine start and run events. During subsequent engine start and run events, the run AF adjustment term will be added to a base run AF ratio to create a run AF ratio which will be used by the engine controller to run the engine during initial operation.

It is an object of this invention to provide compensation for varying fuel volatility during engine crank and initial operation, as manifested by engine crank time, engine operating speed until a given amount of time, and engine roughness during the initial operation.

It is a further object of this invention to provide compensation for varying fuel volatility during initial operation, by compensating for incomplete fuel vaporization as a function of predicted intake valve temperature.

These and other objects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE INVENTION

Figure 1:
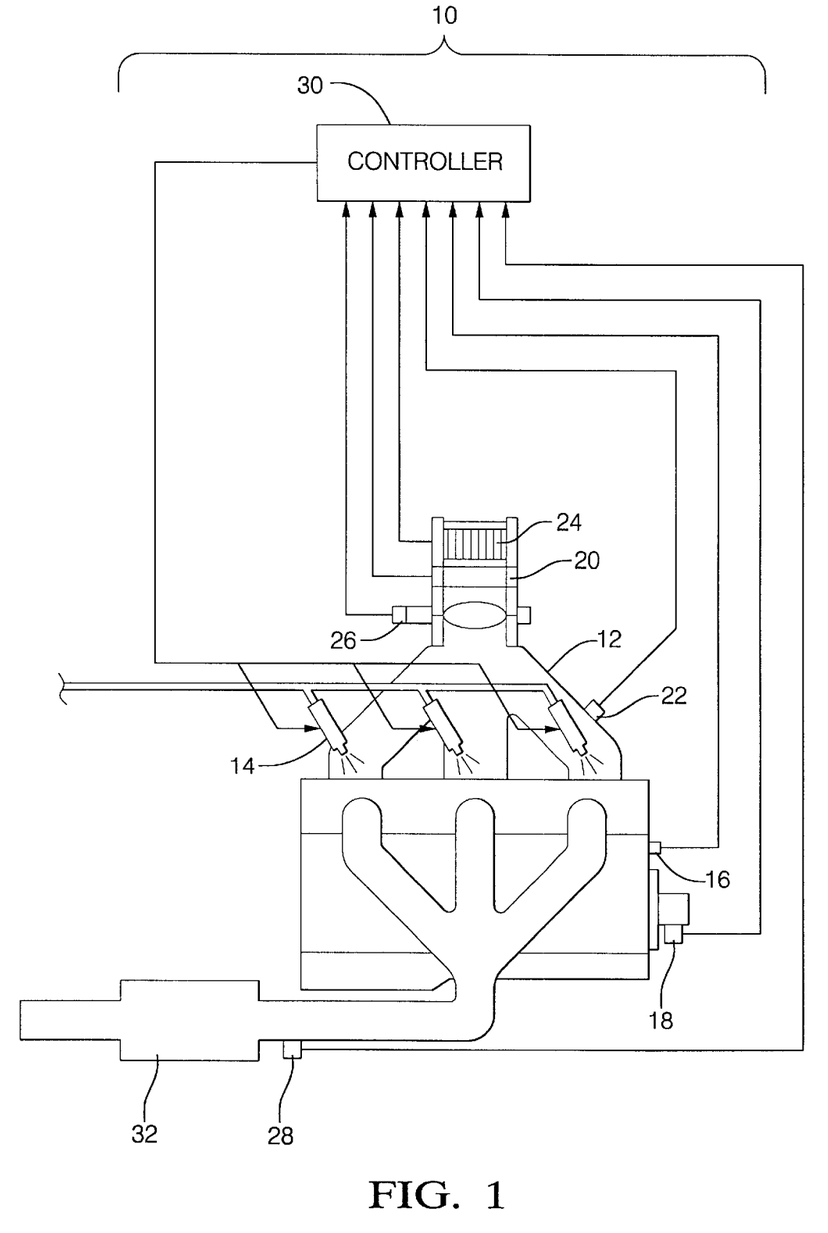
FIG. 1 is a diagram of a powertrain and control system in accordance with the present invention.

Referring now to the drawings, wherein the showings are for the purpose of illustrating the preferred embodiment of the invention only and not for the purpose of limiting the same, FIG. 1 shows an internal combustion engine and control system 10 that has been constructed in accordance with the present invention. The engine supplies power to driveline and accessory components (not shown). The engine includes an air intake system 12 that delivers air into the combustion chambers of individual cylinders, a fuel system 14 that delivers fuel at or near the intake to the cylinders, as well as other systems that provide for the complete operation of the engine. The engine has one or more sensors that monitor the engine operation and ambient conditions, and provide information to the engine controller. These sensors may comprise a coolant temperature sensor 16, a crankshaft position sensor 18, an ambient air temperature sensor 20, a manifold absolute pressure sensor 22, a mass airflow sensor 24, a throttle position sensor 26, an exhaust gas sensor 28, and others (not shown). This engine configuration is well known to one skilled in the art.

The engine control system is made up of an electronic engine controller 30 that collects information from sensors and drives output devices in accordance with predetermined algorithms and calibrations (not shown). This engine control is well known to those skilled in the art. In a typical operation, the control system integrates inputs from the various sensors into software logic algorithms made up of calibration tables and equations contained therein. The control system can then provide output to the various systems of the engine. These systems include the fuel system 14, which delivers a specific amount of fuel to a cylinder to achieve a desired AF ratio, based on the mass of air delivered. The AF ratio is controlled to ensure that a catalytic converter system 32 operates at an optimal level for the given conditions. This AF ratio is continually monitored and optimized to accommodate changes in inputs to the engine, changes in engine operating conditions, and changes in operator demands.

The primary method to control the engine-out AF ratio when the engine is in a warmed up condition is to use feedback from the exhaust gas sensor 28, primarily an oxygen sensor or a wide-range sensor. During cold start operation the engine controller will control engine operation using input from sensors other than the exhaust gas sensor 28 and preset calibrations contained within the controller. The sensors may include the coolant temperature sensor 16, the crankshaft position sensor 18, the ambient air temperature sensor 20, the manifold absolute pressure sensor 22, the mass airflow sensor 24, or the throttle position sensor 26 or others. This engine control is well known to those skilled in the art.

Figure 2:
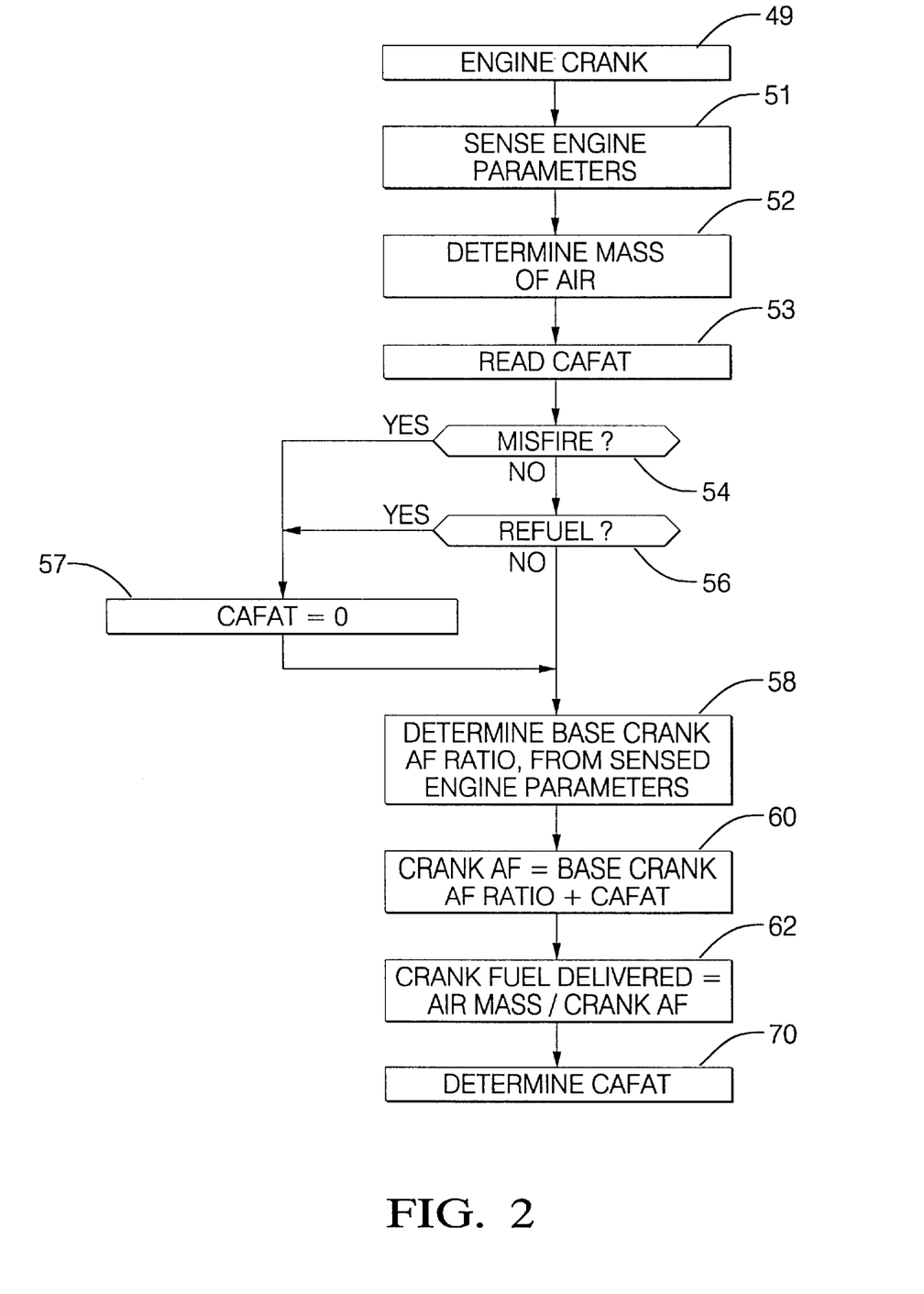
FIG. 2 is a flow diagram showing the amount of fuel to deliver during engine crank, adjusted for fuel volatility in accordance with the present invention.
Figure 3:
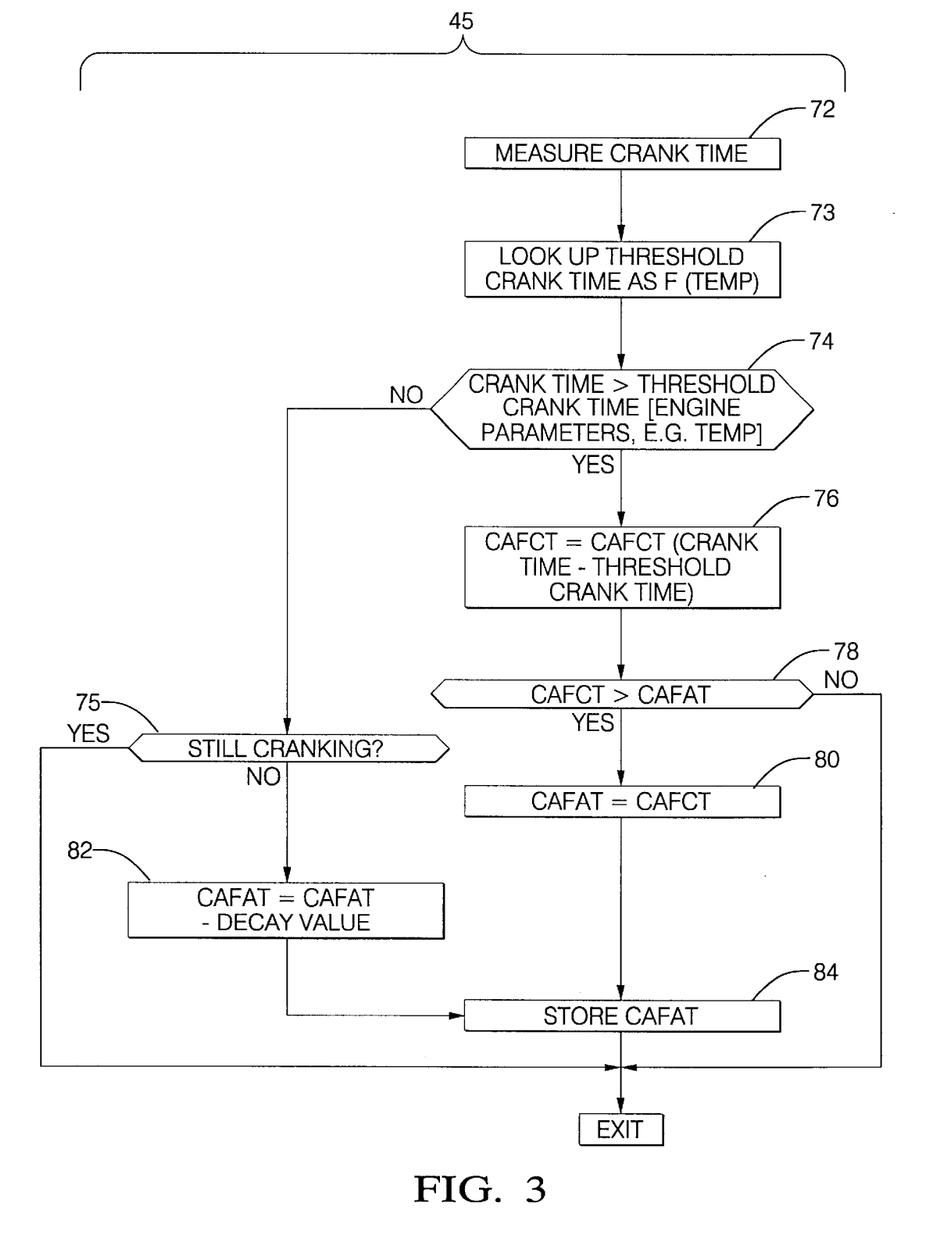
FIG. 3 is a flow diagram showing the crank AF adjustment term in accordance with the present invention.

FIGS. 2 and 3 provide a preferred embodiment of a method to compensate fueling during engine crank due to variations in the volatility of fuel.

Referring to FIG. 2, a flow diagram representing a control method used by the engine controller 30 to determine the amount of fuel to deliver during engine crank adjusted for fuel volatility, is shown. Crank AF Adjustment Term (CAFAT) 45 is a term that represents the volatility of fuel during engine crank. It is stored in the nonvolatile memory of the controller 30, and is updated or reset to a preset value during engine start and operation for use in subsequent starting events. The crank AF adjustment term 45 is set at a preset value prior to an initial engine starting event, or after the controller 30 has been reset electronically. The preset value is also stored in the non-volatile memory of the controller 30 as part of the calibration (not shown).

When engine crank occurs in step 49, one or more predetermined engine parameters is sensed in step 51 and a mass of air delivered to the engine is determined in step 52 based on the sensed parameters. The mass of air in step 52 can be determined by direct measurement, using a mass air flow sensor 24, or it can be determined by estimation based upon sensed parameters including for example, manifold absolute pressure sensor 22, coolant temperature sensor 16, the throttle position sensor 26 amongst others. This method of determining the mass of air is well known to those skilled in the art. The crank AF adjustment term 45 is then read in step 53.

A base crank AF ratio necessary to start the engine is determined in step 58, as a function of the predetermined engine parameters sensed in step 51. The method next calculates a crank AF ratio in step 60 by combining the base crank AF ratio of step 58 with the crank AF adjustment term 45. The crank fuel, which is the amount of fuel necessary to start the engine is then determined in step 62 by combining the crank AF ratio of step 60 with the mass of air delivered from step 52. In the present invention this is accomplished by multiplying the inverse of the crank AF ratio and the mass of air. The controller 30 uses the crank fuel calculated in step 62 to drive the fuel system 14 to deliver the appropriate amount of crank fuel necessary to start the engine. During engine crank, the crank AF adjustment term 45 can be updated. It will also be stored for use in subsequent engine starting events. This is shown in FIG. 3.

Referring now to FIG. 3, a flow diagram representing a method to determine the crank AF adjustment term 45 is shown. The method to calculate crank AF adjustment term begins by measuring the engine crank time in step 72, and determining a threshold crank time in step 73 based upon the sensed coolant temperature 16. The engine crank time is then compared to the threshold crank time in step 74. When the engine crank time does not exceed the threshold engine crank time in step 74, the method will check to see if the engine is still cranking in step 75. If the engine has started, the crank AF adjustment term 45 will be reduced by a decay value as shown in step 82 when the engine crank time does not exceed the threshold engine crank time. The resulting crank AF adjustment term is then stored in step 84. The use of the decay value in step 82 ensures that the crank AF adjustment term is continually adapting to changes in fuel volatility that may occur due to weathering, fuel mixing or other causes. The magnitude of the decay value in step 82 can be established during engine calibration.

In contrast, when the engine crank time exceeds the threshold engine crank time in step 74, a crank AF compensation term is selected from a calibration table (not shown) in step 76. This selection in step 76 is based on the difference between the engine crank time and the threshold engine crank time. In the preferred embodiment, the calibration table (not shown) is created during engine development and calibration. The calibration table (not shown) contains engine crank times that correspond to a range of coolant temperatures, typically from −40C to +60C (−40F to +140F), and is created by measuring engine crank times on representative engines at the various temperatures, with reference fuels, e.g. emissions test fuels.

The crank AF compensation term determined in step 76 is next compared to the crank AF adjustment term 45, in step 78. Where the crank AF compensation term is greater than the crank AF adjustment term 45, the crank AF adjustment term 45 is made equal to the crank AF compensation term in step 80. In step 84 this value is stored in memory for use in subsequent engine starts, and the method is exited.

Referring again to FIG. 2, the method will respond to changes to fuel volatility that are caused by a sudden change in fuel, such as may result when the fuel supply is replenished. This would happen on a vehicle when the vehicle is refueled. A refueling event may be sensed by a significant change in the sensed fuel level compared to a threshold. In step 56, when a refueling event has been sensed, the crank AF adjustment term 45 will be reset to the preset value as shown in step 57. This preset value will be the crank AF adjustment term 45 used by the method to calculate the crank AF in step 60. The method of determining the crank AF adjustment term 45 shown in FIG. 3 will occur again after the engine has been started.

The method also responds to changes to engine operation that evidence engine roughness, such as is caused by a malfunction that would lead to intermittent or ongoing engine misfire. This is shown in step 54. In this event, the crank AF adjustment term 45 is reset to its preset value as shown in step 57, and this preset value will be the crank AF adjustment term 45 used by the method to calculate the crank fuel in step 60. The method of determining the crank AF adjustment term 45 shown in FIG. 3 will happen again after the engine has been started. In the preferred embodiment, engine roughness is determined using information from a misfire monitoring algorithm associated with the on-board diagnostic system. The misfire monitor algorithms are well known to those skilled in the art. The roughness threshold used in the present invention must be calibrated based on the performance of a specific engine design. It can be determined during the engine development process using fuels of representative volatilities.

FIGS. 4, 5, 6, 7 and 9 provide a preferred embodiment of a method to compensate fueling during initial engine operation after start due to variations in the volatility of the fuel.

Figure 4:
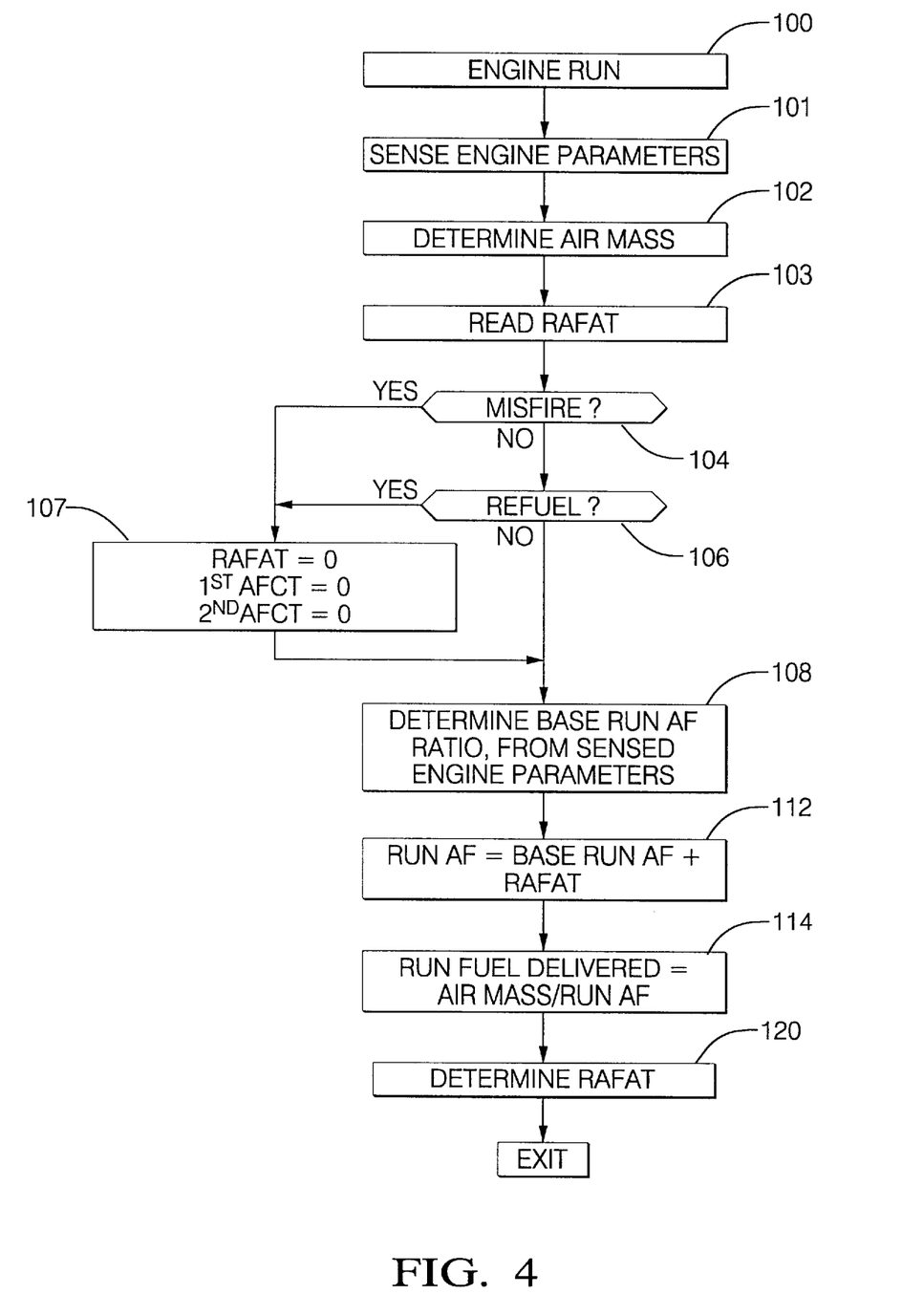
FIG. 4 is a flow diagram showing the amount of fuel to deliver during initial engine operation adjusted for fuel volatility, in accordance with the present invention.

Referring now to FIG. 4, a flow diagram representing a method that determines the amount of fuel to deliver during initial engine operation, adjusted for fuel volatility, is shown 100. The engine controller 30 senses various engine parameters 102 during initial engine operation after start.

Referring now to FIG. 4, a flow diagram representing a control method used by the engine controller 30 to determine the amount of fuel to deliver during initial engine operation, adjusted for fuel volatility, is shown. A run AF adjustment term 95 (RAFAT) is a term that represents the volatility of fuel during initial engine operation. There are also two interim terms called a first AF compensation term 96 F ($1^{st}$ AFCT) and a second AF compensation term 97 ($2^{nd}$ AFCT) that are used by the control method. The run AF adjustment term 95 and the first and second AF compensation terms 96, 97 are set at preset values prior to an initial engine operation, or after the controller 30 has been reset electronically. The preset values are also stored in the non-volatile memory of the controller 30 as part of the calibration (not shown).

When initial engine operation begins in step 100, one or more predetermined engine parameters is sensed in step 101 and a mass of air delivered to the engine is determined in step 102 based on the sensed parameters. As stated earlier, The mass of air in step 102 can be determined by direct measurement, using a mass air flow sensor 24, or it can be determined by estimation based upon sensed parameters including for example, manifold absolute pressure sensor 22, coolant temperature sensor 16, the throttle position sensor 26 amongst others. This method of determining the mass of air is well known to those skilled in the art. The run AF adjustment term 95 is then read in step 103.

A base run AF ratio necessary to run the engine is determined in step 108, as a function of the predetermined engine parameters sensed in step 101. The method next calculates a run AF ratio in step 112 by combining the base run AF ratio of step 108 with the run AF adjustment term 95. The run fuel, which is the amount of fuel necessary to run the engine is then determined in step 114 by combining the run AF ratio of step 112 with the mass of air delivered from step 102. In the present invention this is accomplished by multiplying the inverse of the run AF ratio and the mass of air. The run fuel calculated in step 114 is used by the controller 30 to drive the fuel system 14 to deliver the appropriate amount of fuel necessary to operate the engine. At the end of the initial engine operation, the run AF adjustment term 95 will be updated for use in subsequent engine operating events. This is shown in FIG. 5.

Figure 5:
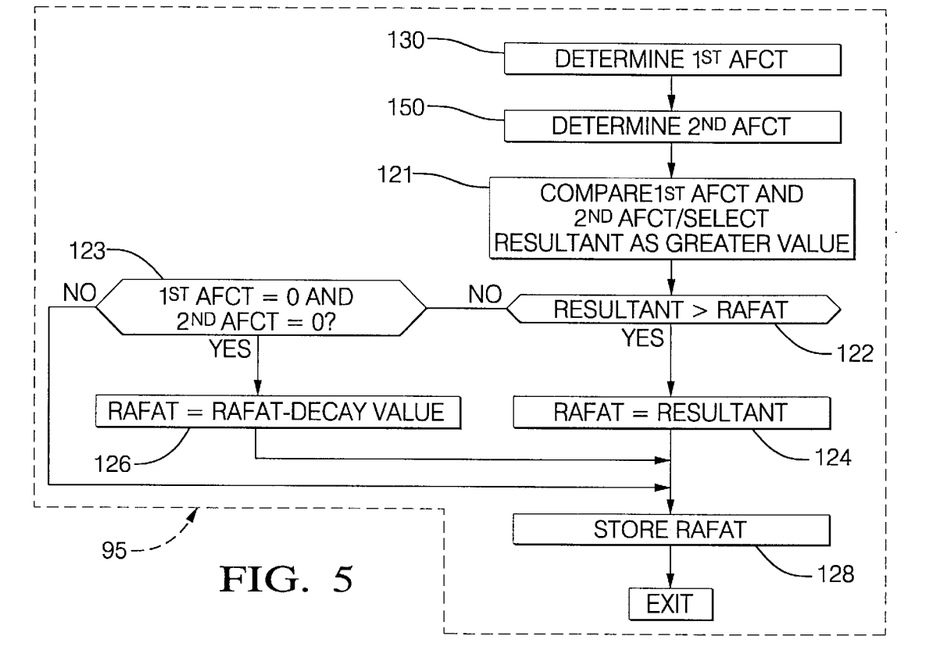
FIG. 5 is a flow diagram showing the run AF adjustment term, in accordance with the present invention.

Referring now to FIG. 5, a flow diagram representing a method to determine the run AF adjustment term is shown. The method to determine the run AF adjustment term 95 during initial engine operation includes step 130 to determine the first AF compensation term 96 and step 150 to determine the second AF compensation term 97. In step 121 the two compensation values are compared, and the greater is selected as a resultant. This resultant is compared with the existing run AF adjustment term in step 122. If it is determined in step 122 that the resultant is greater than the run AF adjustment term 95, then the run AF adjustment term 95 is made equal to the resultant (step 124) and the run AF adjustment term 95 is stored for use on subsequent engine operations (step 128). If neither the first AF compensation term nor the second AF compensation term is calculated, then the run AF adjustment term 95 is reduced by a decay value as shown in step 126, and the resulting run AF adjustment term is stored in step 128. The use of the decay value in step 126 ensures that the run AF adjustment term is continually adapting to changes in fuel volatility that may occur due to weathering, fuel mixing or other causes. The magnitude of the decay value in step 126 can be established during engine calibration.

Referring again to FIG. 4, the method will respond to changes to fuel volatility that are caused by a sudden change in fuel when the fuel supply is replenished. This happens on a vehicle when the vehicle is refueled. In step 106, when a refueling event has been sensed, the run AF adjustment term 95, and the first and second AF compensation terms 96, 97 will be reset to the preset value as shown in step 107, and this preset value for run AF adjustment term 95 will be used by the method to calculate the run AF in step 112. The method of determining the run AF adjustment term shown in FIG. 5 will happen during the period when the engine is in the initial run phase.

The method also responds to changes to engine operation that evidence engine roughness, such as is caused by a malfunction that would lead to intermittent or ongoing engine misfire. This is shown is step 104. In such an event, the run AF adjustment term and the first and second AF compensation terms 96, 97 are reset to their preset values as shown in step 107, and the preset value for the run AF adjustment term 95 will be used by the method to calculate the run AF in step 112. The method of determining the run AF adjustment term shown in FIG. 5 will happen again after the engine is beyond the initial run phase. In the preferred embodiment, engine roughness is determined using information from a misfire monitoring algorithm associated with the on-board diagnostic system. The misfire monitor algorithms are well known to those skilled in the art. The roughness threshold used in the present invention must be calibrated based on the performance of a specific engine design. It can be determined during the engine development process using fuels of representative volatilities.

Figure 6:
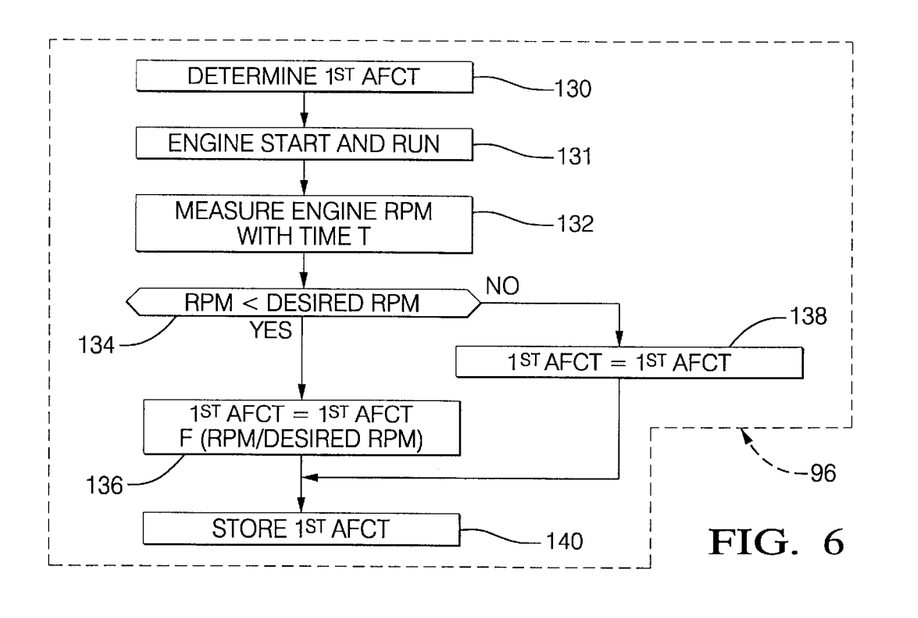
FIG. 6 is a flow diagram showing a detailed aspect of the present invention.

Referring now to FIG. 6, a flow diagram representing a method to determine the first AF compensation term 96 is shown. The method to determine the first AF compensation term 96 during initial engine operation includes measuring the engine rotational speed ("rpm") until a specific time T after the engine has started, as shown in step 132. The engine speed is compared to a desired engine speed in step 134. If it is determined in step 134 that the desired engine speed is greater than the engine speed measured in step 132, then the first AF compensation term 96 is selected from a calibration table (not shown) as a function of the ratio of the engine speed divided by the desired engine speed. In the preferred embodiment, the calibration table (not shown) is created during engine development and calibration. The calibration table (not shown) contains first AF compensation terms 96 that correspond to a range of ratios of engine speed divided by the desired engine speed, and is created by measuring engine speeds on representative engines with fuels of varying volatility. The desired engine speed used in step 134 is created by measuring engine speed until time T on representative engines with fuel of reference volatility, typically fuel used when running emissions tests. The first AF compensation term 96 selected in step 136 is stored in step 140. If it is determined in step 134 that the desired engine speed is not greater than the engine speed that was measured in step 132, then the first AF compensation term 96 is unchanged, as shown in steps 138 and 140.

Figure 8:
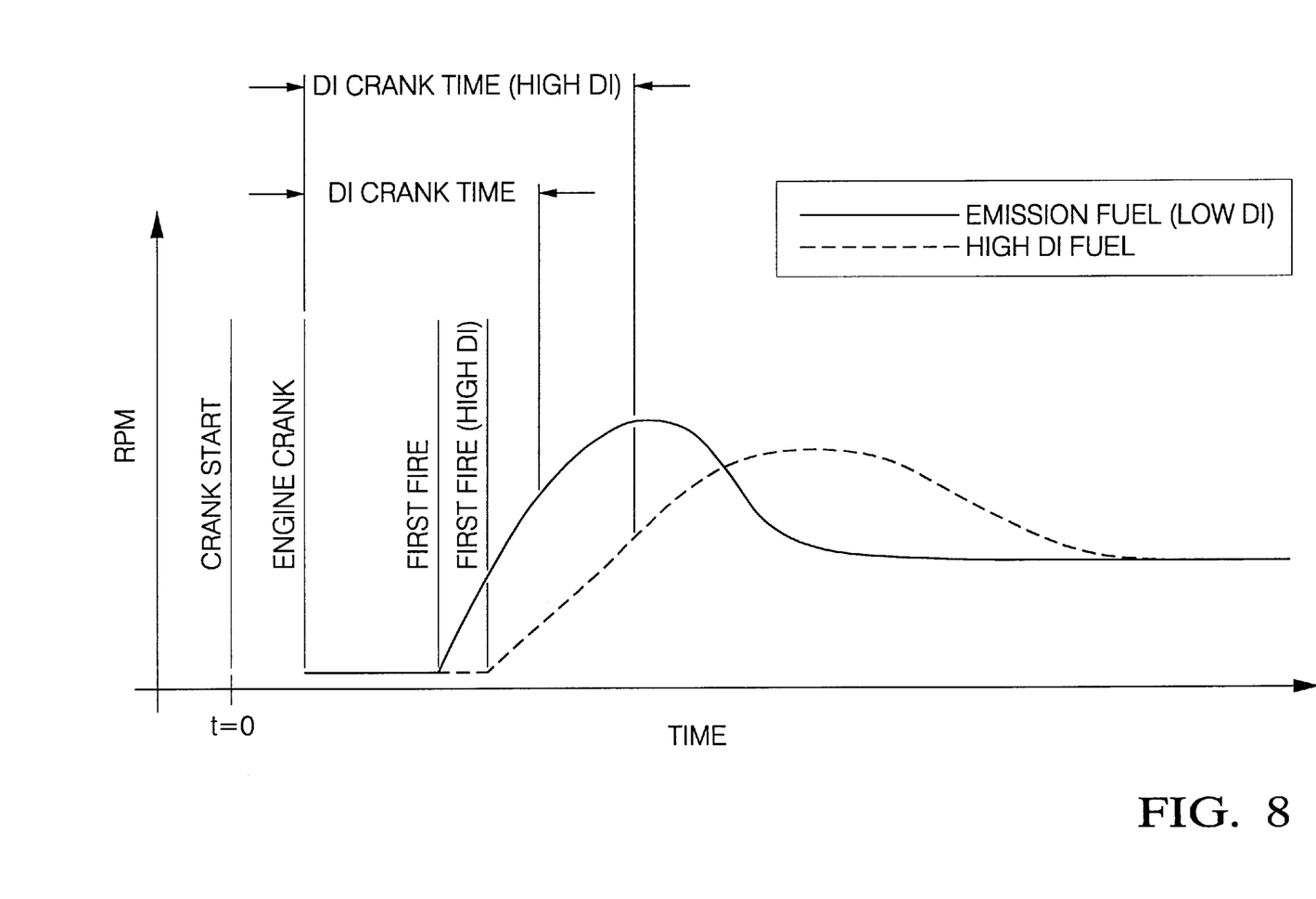
FIG. 8 is a graphical diagram showing engine speed versus time using the present invention.

The specific time T after start is typically set at or about 5 seconds after the engine is started, and is calibrated based on the specific characteristics of an engine design, using a representative engine during the engine development process. The basis behind calculating the first AF compensation term 96 is that an engine has a predictable engine flare performance immediately after start, and this flare can be directly related to the fuel volatility. This result is also shown graphically in FIG. 8.

Figure 7:
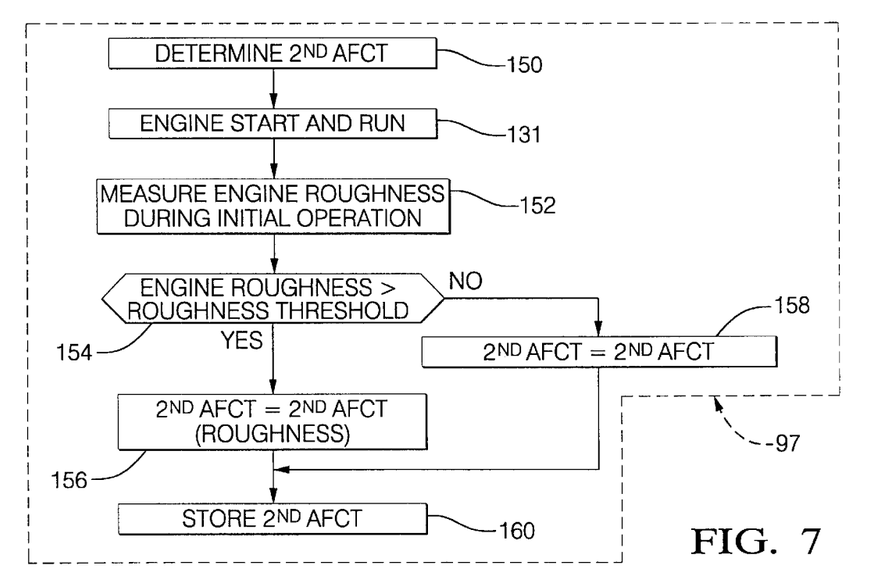
FIG. 7 is a flow diagram showing another detailed aspect of the present invention.

Referring now to FIG. 7, a flow diagram representing a method to determine the second AF compensation term 97 is shown. The method to determine the second AF compensation term 97 during initial engine operation includes measuring the engine roughness during initial operation, as shown in step 152. The engine roughness is compared to a threshold engine roughness in step 154. If it is determined in step 154 that the engine roughness measured in step 152 is greater than the threshold engine roughness, then the second AF compensation term 97 is selected from a another calibration table (not shown) as a function of the magnitude of the roughness. In the preferred embodiment, the calibration table (not shown) is created during engine development and calibration. The calibration table (not shown) contains a range of second AF compensation terms 97 that correspond to a range of levels of engine roughness, and is created by measuring engine roughness on representative engines with fuels of varying volatility. The second AF compensation term 97 selected in step 156 is stored in step 160.

In the preferred embodiment, engine roughness used in step 152 is determined using information from a misfire monitoring algorithm (not shown) associated with the on-board diagnostic system (not shown). Misfire monitor algorithms and the on-board diagnostic system are well known to those skilled in the art. The roughness threshold used in the present invention must be calibrated based on performance of a specific engine design. It can be determined during the engine development process using fuels of representative volatilities.

In the preferred embodiment, the engine roughness used in step 152 is continually monitored during initial operation of the engine after start. In the present embodiment, a timer is used to determine the length of initial operation of this method. The end of the measurement of engine roughness used in step 152 can also be determined by an event such as when the engine 10 goes into closed loop operation, using the exhaust gas sensor 26. The end of the measurement of engine roughness used in step 152 can also be determined by an event such as when the engine 10 has exceeded a preset number of engine revolutions. The end of the measurement of engine roughness used in step 152 can also be determined by intake valve temperature, as described below. In any event, once the initial operation is complete, a value for engine roughness is determined per step 152, and compared to the roughness threshold in step 154.

Figure 9:
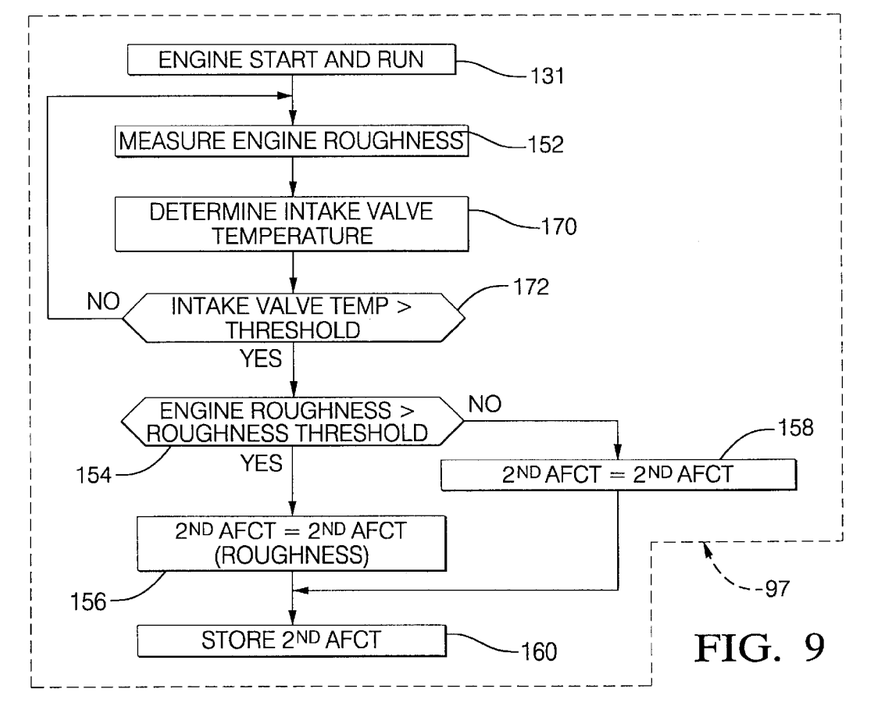
FIG. 9 is a flow diagram showing an alternate embodiment of a detailed aspect of the present invention.

Referring now to FIG. 9, a flow diagram representing an alternate embodiment of a method to determine the second AF compensation term 97 is shown. The method to determine the second AF compensation term 97 during initial engine operation includes measuring the magnitude of engine roughness during initial operation, as shown in step 152. A temperature of an intake valve is then determined in step 170. The temperature of the intake valve determined in step 170 is compared to a threshold in step 172. If it is determined in step 172 that the intake valve temperature is below the threshold, the method continues to measure engine roughness, in step 152, and determine the temperature of the intake valve, in step 170. Until the temperature of the intake valve exceeds the threshold in step 172, the engine roughness measured during step 152 will be compared to a threshold engine roughness in step 154. If it is determined in step 154 that the engine roughness measured in step 152 is greater than the threshold engine roughness, then the second AF compensation term 97 is selected from a another calibration table (not shown) as a function of the magnitude of the roughness. In the preferred embodiment, the calibration table (not shown) is created during engine development and calibration. The calibration table (not shown) contains a range of second AF compensation terms 97 that correspond to a range of levels of engine roughness, and is created by measuring engine roughness on representative engines with fuels of varying volatility. The second AF compensation term 97 selected in step 156 is stored in step 160.

The method of determining the intake valve temperature in engine control systems comprises estimating the intake valve temperature using pneumatic state estimators (PSE) and thermal state estimators (TSE), as described in Maloney '496 and incorporated by reference herewith. This method comprehends that fuel vaporization will improve with increase in temperature of the intake valve. Therefore the need to compensate the run AF ratio will be directly affected by the interaction between the fuel volatility and the intake valve temperature.

The invention has been described with specific reference to the preferred embodiments and modifications thereto. Further modifications and alterations may occur to others upon reading and understanding the specification. It is intended to include all such modifications and alterations insofar as they come within the scope of the invention. Some modifications include the following:

selecting the crank AF compensation term in step 76 from a calibration table (not shown) that has been derived based on a ratio between crank time and a threshold crank time;

selecting the first AF compensation term in step 136 from a calibration table (not shown) that has been derived based on a difference between engine speed and the desired engine speed; and determining the engine roughness used in step 152 based upon other methods, such as direct interpretation of the input from the crankshaft position sensor 18, or engine knock, or ionic sense ignition systems. It is also understood that any other calculations, tables, or derivations that are based upon additions or subtractions can readily be calculated or derived using operations that include multiplication or division.

Having thus described the invention, it is claimed:

1. A method for fueling an internal combustion engine during initial engine operation after start, comprising:

sensing predetermined engine parameters;

determining a base run AF ratio as a function of the sensed engine parameters;

determining a mass of air delivered to the engine as a function of the sensed engine parameters;

determining a run AF adjustment term as a function of fuel volatility;

calculating a run AF ratio by combining the base run AF ratio with the run AF adjustment term; and determining fueling by combining the run AF ratio with the mass of air delivered.

2. The method in claim 1, wherein the method for determining the run AF adjustment term during initial engine operation comprises:

determining a first AF compensation term as a function of engine sag after start;

determining a second AF compensation term as a function of engine roughness;

selecting a greater value from a comparison of the first AF compensation term and second AF compensation term as a resultant;

comparing the resultant with a run AF adjustment term; and determining the run AF adjustment term to be equal to the resultant when the resultant is greater than the run AF adjustment term.

3. The method in claim 2, wherein the method for determining the run AF adjustment term includes reducing the run AF adjustment term by a decay value when the resultant is less than the run AF adjustment term.

4. The method in claim 3, wherein the method for determining the run AF adjustment term includes storing the run AF adjustment term in memory for use in subsequent engine operation events.

5. The method in claim 2, wherein determining the first AF compensation term comprises:

measuring engine speed until a specific time after engine start has been determined;

comparing the engine speed to a desired engine speed; and selecting the first AF compensation term from a table as a function of the ratio of the engine speed and the predetermined engine speed, when the engine speed is less than said desired engine speed.

6. The method in claim 2, wherein determining the second AF compensation term comprises:

measuring engine roughness during initial engine operation;

comparing the engine roughness to a roughness threshold; and selecting the second AF compensation term from a table as a function of the engine roughness when the engine roughness exceeds the roughness threshold.

7. The method in claim 1, wherein the method to determine the run AF adjustment term includes setting the run AF adjustment term to a preset value prior to initial engine run.

8. The method in claim 2, wherein the method to determine the first AF compensation term includes setting the first AF compensation term to a preset value prior to initial engine run.

9. The method in claim 2, wherein the method to determine the second AF compensation term includes setting the second AF compensation term to a preset value prior to initial engine run.

10. The method in claim 7, wherein the method to determine the run AF adjustment term includes setting the run AF adjustment term to the preset value when it has been detected that the fuel supply has been replenished.

11. The method in claim 7, wherein the method to determine the run AF adjustment term includes setting the run AF adjustment term to the preset value when it has been detected that engine misfire has occurred.

12. The method in claim 8, wherein the method to determine the first AF compensation term includes setting the first AF compensation term to the preset value when it has been detected that the fuel supply has been replenished.

13. The method in claim 8, wherein the method to determine the first AF compensation term includes setting the first AF compensation term to the preset value when it has been detected that engine misfire has occurred.

14. The method in claim 9, wherein the method to determine the second AF compensation term includes setting the second AF compensation term to the preset value when it has been detected that the fuel supply has been replenished.

15. The method in claim 9, wherein the method to determine the second AF compensation term includes setting the second AF compensation term to the preset value when it has been detected that engine misfire has occurred.

16. The method in claim 5, wherein the specific time after engine start is five seconds.

17. The method in claim 2, wherein determining the second AF compensation term comprises:

measuring engine roughness during initial engine operation;

determining an intake valve temperature;

comparing the measured engine roughness to a roughness threshold until the intake valve temperature exceeds a threshold value; and selecting the second AF compensation term from a table as a function of the engine roughness when the engine roughness exceeds the roughness threshold.

18. A method for determining a run AF ratio in an internal combustion engine during initial engine operation, comprising:

determining a run AF adjustment term based upon fuel volatility; and, combining a base run AF ratio with the run AF compensation term;

wherein determining the run AF adjustment term comprises:

determining a first AF compensation term based upon engine flare performance;

determining a second AF compensation term based upon engine roughness; and selecting a greater value from a comparison of the first AF compensation term and the second AF compensation term.

* * * * *